(No Model.)
J. PFLEGING.
LEAD FOR SETTING STAINED GLASS.
No. 340,353. Patented Apr. 20, 1886.
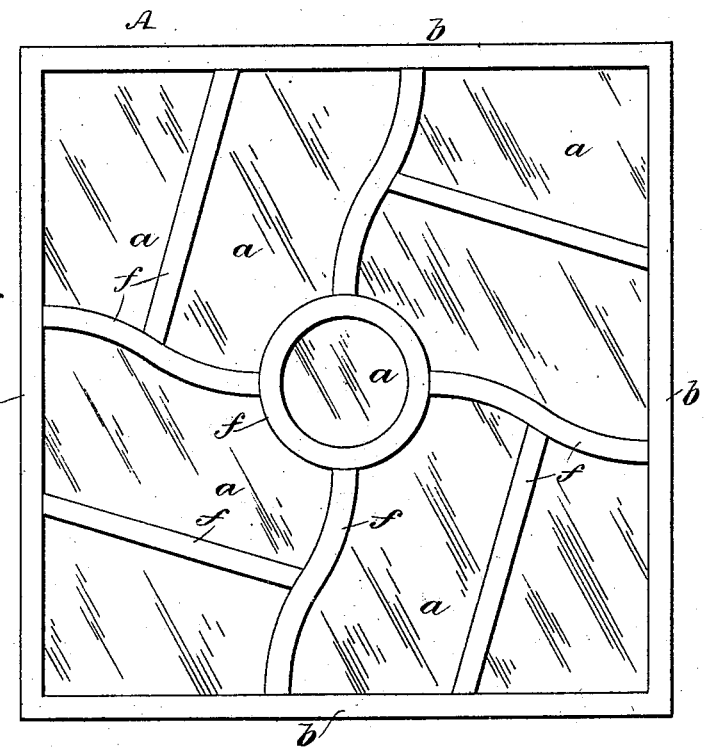
Fig. 1.
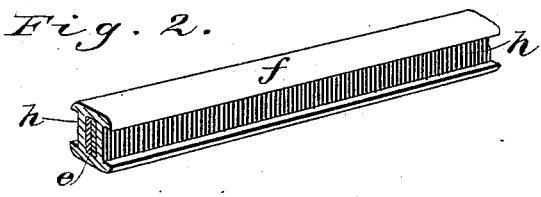
Fig. 2.
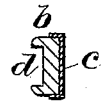  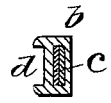  
Fig. 3.   Fig. 5.   Fig. 6.
Fig. 4.
Fig. 7.
WITNESSES:
John K. Deemer
C. Sedgwick
INVENTOR:
J. Pfleging
BY Munn & Co
ATTORNEYS.

UNITED STATES PATENT OFFICE.

JACOB PFLEGING, OF NEW YORK, N. Y.

LEAD FOR SETTING STAINED GLASS.

SPECIFICATION forming part of Letters Patent No. 340,353, dated April 20, 1886.

Application filed February 16, 1886. Serial No. 192,158. (No model.)

*To all whom it may concern:*

Be it known that I, JACOB PFLEGING, of the city, county, and State of New York, have invented certain new and useful Improvements in Leads for Setting Stained Glass, of which the following is a full, clear, and exact description.

Reference is to be had to the accompanying drawings, forming part of this specification, in which similar letters of reference indicate corresponding parts in all the figures.

Figure 1 is a plan view of a stained-glass panel. Fig. 2 is an enlarged perspective view of one of my new and improved leads for holding the pieces of stained glass. Fig. 3 is a cross-section of the outer strip; and Figs. 4, 5, 6, and 7 are transverse sectional views showing modified forms of lead stiffening.

A represents a panel composed of several irregularly shaped pieces, $a\ a$, of stained glass. The panel is bound by the strip $b$ of lead, stiffened by one or more plates, $c$, of tin-plate or other metal, one edge of the lead being formed with a groove, $d$, to embrace the outer edges of the pieces $a$ of glass. (See Fig. 3.) The adjacent edges of the pieces $a$ of glass are held by strips $f$ of lead, which are stiffened by one or more plates, $e$, of tin or other metal, both edges of the strips being grooved, as shown at $h\ h$, to embrace the edges of the pieces of glass. The leads $f$ are pliable, so they may be easily bent to conform to the shape of the edges which they hold, and where the leads $f$ meet one another, and where they meet the surrounding strip $b$, they are soldered, so they form a net-work and hold the edges of the pieces of glass at all points. The stiffening-strips $e\ e$ are embedded in the leads, and are placed so as to stand at right angles to the flat surfaces of the pieces $a$ of glass, so said strips do not materially interfere with the flexibility of the leads when bent laterally in the direction of the grooves that receive the edges of the glass, but prevent the leads from being bent in the opposite direction.

In the form of lead shown in Fig. 4, instead of embedding the stiffening-strip within the lead, a strip of stiffening metal may be applied to the flat outer surface, $g$, and soldered or otherwise fastened, if desired; and in the form shown in Fig. 5 the stiffening-plate is formed with narrow flanges at both its edges to embrace the edges of the leads. In Fig. 6 two stiffening-plates are used, each formed with flanges, and the strips are embedded in or placed between two strips of lead, as shown; and Fig. 7 shows a modified form of flange.

The leads commonly used in stained-glass setting are without stiffening, and are nearly as pliable in one direction as the other, and hence contribute but little to the strength and rigidity of the panel, so separate rods have to be used placed crosswise of the panel for strengthening and stiffening the same; but with my new leads no separate rods are required, as the stiffening-plates applied to the leads render the panels sufficiently firm and rigid without separate braces or rods.

Having thus described my invention, I claim as new and desire to secure by Letters Patent—

1. As a new article of manufacture, a grooved lead for setting stained glass, having a strip of stiffening material applied to it, substantially as described.

2. The lead $f$, having grooves $h\ h$ formed in it, in combination with the stiffening-strips $e$, embedded in the lead, substantially as described.

JACOB PFLEGING.

Witnesses:
EDWARD H. LÜBKERT,
H. A. WEST.